United States Patent
Jadric et al.

(10) Patent No.: US 6,686,718 B2
(45) Date of Patent: Feb. 3, 2004

(54) CONTROL LOOP AND METHOD FOR VARIABLE SPEED DRIVE RIDE-THROUGH CAPABILITY IMPROVEMENT

(75) Inventors: Ivan Jadric, York, PA (US); Harold Schnetzka, York, PA (US)

(73) Assignee: York International Corp., York, PA (US)

( * ) Notice: Subject to any disclaimer, the term of this patent is extended or adjusted under 35 U.S.C. 154(b) by 0 days.

(21) Appl. No.: 09/993,638

(22) Filed: Nov. 27, 2001

(65) Prior Publication Data

US 2003/0098668 A1 May 29, 2003

(51) Int. Cl.[7] .............................. H02P 5/34; H02P 7/42
(52) U.S. Cl. ...................... 318/801; 318/479; 318/812
(58) Field of Search .................. 318/727, 798–802, 318/805, 812, 375, 380, 479

(56) References Cited

U.S. PATENT DOCUMENTS

| | | | |
|---|---|---|---|
| 3,593,103 A | 7/1971 | Chandler et al. | 321/1 |
| 3,985,954 A | 10/1976 | Kuniyoshi et al. | 178/7.3 |
| 4,146,829 A | 3/1979 | Rinaldi | 320/13 |
| 4,400,661 A | 8/1983 | Duley | 323/275 |
| 4,628,395 A * | 12/1986 | Sugishima | 318/806 |
| 4,656,571 A | 4/1987 | Umezu | |
| 4,694,236 A | 9/1987 | Upadhyay et al. | 318/798 |
| 4,761,726 A | 8/1988 | Brown | 363/51 |
| 4,843,533 A | 6/1989 | Roof et al. | 363/55 |
| 4,879,639 A * | 11/1989 | Tsukahara | 318/803 |
| 4,902,954 A | 2/1990 | Oshima et al. | |
| 5,081,368 A | 1/1992 | West | 307/67 |
| 5,099,410 A | 3/1992 | Divan | 363/98 |
| 5,127,085 A | 6/1992 | Becker et al. | 388/903 |
| 5,329,222 A | 7/1994 | Gyugyi et al. | 323/207 |
| 5,465,202 A | 11/1995 | Ibori et al. | 363/37 |
| 5,646,458 A | 7/1997 | Bowyer et al. | 307/67 |
| 5,652,485 A | 7/1997 | Spiegel et al. | 318/147 |
| 5,754,419 A | 5/1998 | Ho | 363/89 |
| 5,847,555 A | 12/1998 | Lewis | 323/299 |
| 5,883,796 A | 3/1999 | Cheng et al. | 363/40 |
| 6,005,362 A | 12/1999 | Enjeti et al. | 318/479 |
| 6,118,676 A | 9/2000 | Divan et al. | 363/34 |
| 6,313,600 B1 | 11/2001 | Hammond et al. | |
| 6,445,879 B1 * | 9/2002 | Youn et al. | 318/438 |

FOREIGN PATENT DOCUMENTS

| | | |
|---|---|---|
| FR | 2 697 114 | 4/1994 |
| JP | 2000-354396 | 12/2000 |

OTHER PUBLICATIONS

US 2001/0036093 A1, published Nov. 1, 2001.
International search Report, , PCT/US02/33004, dated May/ 2003.
von Jouanne et al., "Assessment of Ride–Through Alternatives For Adjustable–Speed Drives," *IEEE Transactions On Industry Applications*, 35(4): 908–916 (1999).
van Zyl et al., "Voltage Sag Ride–Through for Adjustable–Speed Drives With Active Rectifiers," *IEEE Transactions On Industry Applications*, 34(6): 1270–1277 (1998).

* cited by examiner

*Primary Examiner*—Marlon Fletcher
(74) *Attorney, Agent, or Firm*—Finnegan, Henderson, Farabow, Garrett & Dunner, LLP

(57) ABSTRACT

A variable speed drive (VSD) having a rectifier, an inverter, an inverter modulator, an inverter controller, and a control loop, for controlling a motor load, wherein the control loop reduces an amount of power transferred to the inverter during a voltage sag. The control loop may include a reference generator, a filter, a regulator, and a ride-through corrective algorithm. A method for controlling a VSD to improve voltage sag ride-through by monitoring a voltage applied to the VSD, generating a control signal representative of losses in a motor load when a voltage sag is detected in the voltage applied to the VSD and applying less power to the load of the inverter.

25 Claims, 2 Drawing Sheets

CONTROL LOOP AND METHOD FOR VARIABLE SPEED DRIVE RIDE-THROUGH CAPABILITY IMPROVEMENT

DESCRIPTION OF THE INVENTION

1. Field of the Invention

This invention relates to a control loop and method for enabling variable speed drives (VSDs) with an intermediate DC stage to ride through supply voltage sags.

2. Background of the Invention

A typical variable speed drive (VSD) includes three stages, i.e., a rectifier, an intermediate DC link, and an inverter. The rectifying stage converts the fixed-frequency, fixed-voltage input AC power from a power source such as a municipal power company into DC power. The intermediate DC link filters the DC power and has energy storage components, such as capacitors and/or inductors. Finally, the inverting stage converts the DC power into variable-frequency, variable-voltage AC power, supplied to an AC load (typically an induction motor).

The load can operate properly under given conditions only if appropriate voltage is supplied to it. The ability of a VSD to supply voltage to a load depends on the DC voltage at the DC link of the VSD. If this DC voltage decreases below a certain level, the inverter will not be able to supply the required voltage to the load. This could cause unacceptable operating conditions for the load. Unacceptable operation conditions are usually prevented by shutting the VSD down whenever an under-voltage condition is detected at the DC link. In a VSD-controlled system, such a VSD shutdown causes system downtime.

The voltage at the DC link depends on the input AC line voltage of the VSD. This input line voltage has a rated value (e.g., 460 V in the U.S.) around which it varies by a small amount (usually 10%). However, it is not uncommon that much larger temporary variations of the input line voltage occur. When these variations reduce the line voltage and have a duration ranging from half a cycle to one minute, they are called voltage sags. Voltage sags are a common cause of VSD shutdowns, since they cause the DC link voltage to drop below the minimum allowed value. The ability of a VSD to "survive" (i.e., not to shut down) a voltage sag, and to resume regular operation after the voltage sag has been cleared, is called ride-through capability. Good ride-through capability is a desirable feature of any VSD.

One possible way of increasing ride-through capability of a VSD is to use an active rectifier. Such a rectifier is able, through the use of special control methods, to compensate for the variations in the input line voltage. The DC link voltage can therefore be kept at a value large enough to prevent VSD shutdowns. This is described in Annabelle van Zyl et al., *Voltage Sag Ride-Through for Adjustable-Speed Drives with Active Rectifiers*, 34 IEEE Transactions on Industry Applications 1270 (1998), which is incorporated herein by reference.

The most common type of rectifier used in VSDs is passive rectifier. A passive rectifier typically includes a three-phase diode bridge. With a passive rectifier, the DC link voltage is directly proportional to the input line voltage. A passive rectifier therefore does not compensate for the variations in input line voltage. Consequently, a voltage sag will cause the DC link voltage to drop, which, in turn, may cause the VSD to shutdown.

When passive rectifiers are used, one possible way of improving ride-through capability of a VSD is to provide an additional source of power connected to the DC link, as described in Annette von Jouanne et al., *Assessment of Ride-Through Alternatives for Adjustable-Speed Drives*, 35 IEEE Transactions on Industry Applications 908 (1999), which is incorporated herein by reference. Such an additional source of power can be provided by additional capacitors, a DC boost converter, batteries, supercapacitors, motor-generator sets, flywheels, superconducting magnetic energy storage systems, fuel cells, etc. All of these require additional hardware and therefore significantly increase the cost of a VSD.

A relatively inexpensive way of increasing the ride-through capability of a VSD with passive front end is to use the load inertia to generate power during a voltage sag (also described in Annette von Jouanne et al. cited above). In order to achieve this way of increasing the ride through capability, the inverter output frequency during a voltage sag is adjusted to a value slightly below the motor load frequency. This causes the motor to act as a generator and to maintain the DC link voltage at a desired level. This method typically requires motor speed and current sensors, which may add to the cost of a VSD.

SUMMARY OF THE INVENTION

This invention is directed to a variable speed drive comprising a rectifier configured to receive AC power from a power source and output DC power, a DC link configured to receive DC power output from the rectifier, to store some amount of DC energy, and to output DC power, an inverter configured to receive DC power output from the DC link and convert the power back to AC power and output the AC power to a motor load. The invention further includes an inverter controller operatively connected to the inverter and configured to send gating signals to the inverter, a voltage sensor configured to sense voltage applied to the rectifier and provide that sensed voltage to the inverter controller, and a sensor configured to sense at least one of power, current, and voltage of output from at least one of the DC link and the inverter and provide that sensed information to the inverter controller, wherein the inverter controller sends modified gating signals that reduce the power transferred from the inverter to the motor, when the voltage sensor senses a voltage sag.

In another aspect, the invention is also directed to a method for controlling a variable speed drive for a load, the drive including a rectifier, DC link, inverter, and an inverter control. The method comprises monitoring a voltage applied to the rectifier, monitoring at least one of power, voltage, and current output from the DC link or the inverter, controlling the inverter to provide approximately full transfer of power from the rectifier to the load as long as the voltage to the rectifier remains within a preselected range, and controlling the inverter to provide significantly lower power to the load, whenever the voltage to the rectifier falls below the preselected range.

Because the control loop and method of the present invention is based on the control of DC link power, the control loop and method do not require the sensing of motor speed and/or currents, or any additional hardware to be incorporated into a VSD. This makes it particularly suitable for low-cost variable speed drives for commercial industrial applications.

The control loop and method described herein is based on sensing the supply voltage, sensing the power flowing from the DC link to the inverter, and changing the manner in which the inverter is driven, when a sag in supply voltage is detected. The control signals to the inverter are varied, as a function of the detected voltage sag and the detected value of the power output of the DC link, which in turn is dependent upon the inherent load characteristic and operating point of the motor being driven. The generated signals are used to modify the normal control signals (such as amplitude command and frequency command) of the VSD. The modification of the control signals serves to reduce the power flowing from the DC stage to the inverter (and the inverter to the motor) to a minimum or near minimum value sufficient to keep the motor rotating and otherwise conserve the energy stored in the DC link, as long as the input voltage sag lasts. This reduced power flow is meant to prevent the DC link voltage from decreasing to a low value that would lead to a shut down. This, in turn, allows the VSD to resume regular operation after the line voltage sag is corrected.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this specification, illustrate different embodiments of the invention and together with the description, serve to explain the principles of the invention.

DESCRIPTION OF THE EMBODIMENTS

Figure 1:
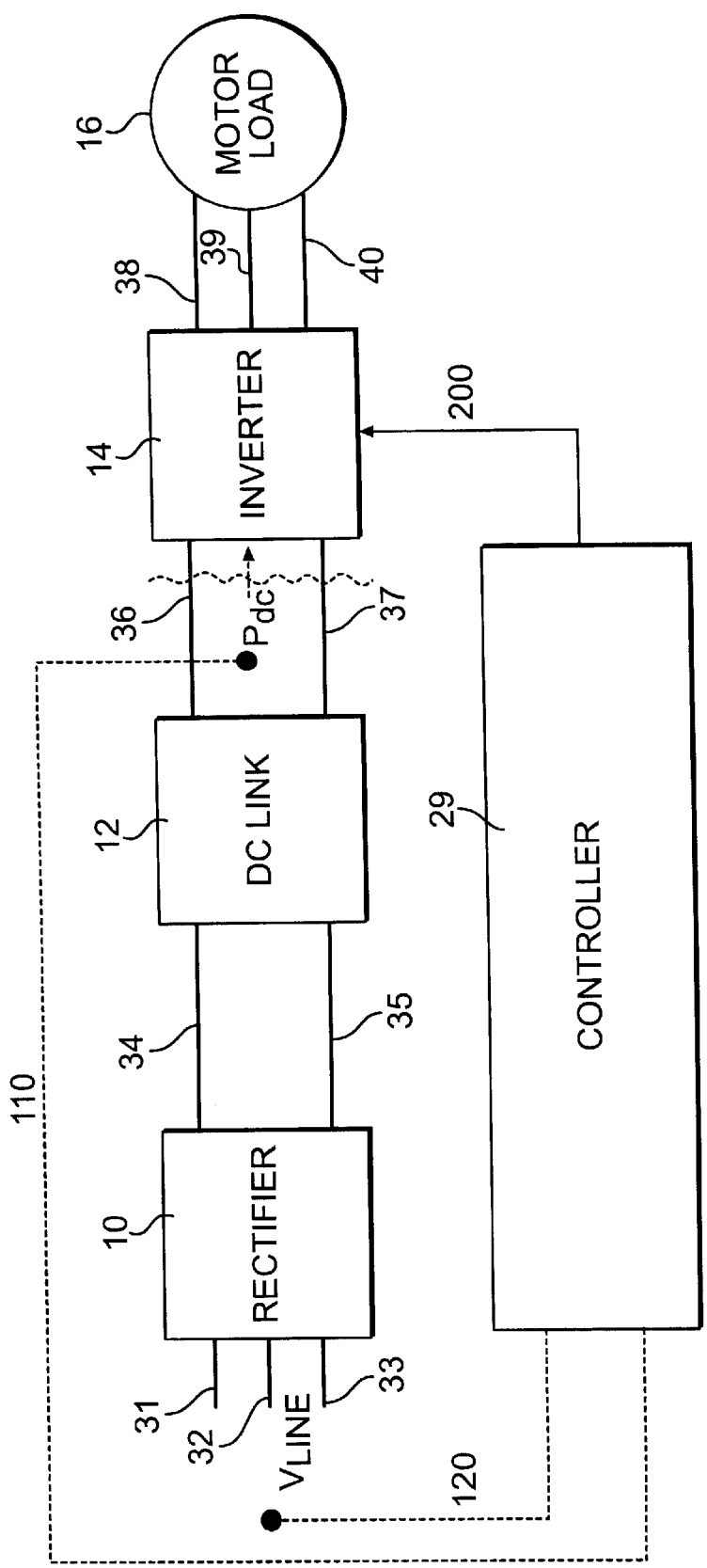
FIG. 1 is a schematic diagram of a generic embodiment of a three stage variable speed drive with a controller that provides ride through control.

Reference will now be made in detail to exemplary embodiments of the invention, examples of which are illustrated in the accompanying drawings.

One purpose of a VSD is to take three-phase power at a fixed voltage and frequency, which may be provided from a utility for example, and convert it to three-phase power at a desired variable voltage and frequency for use in variable-speed electric motors. In the United States, power utilities often provide power at around 460 Volts and at about 60 Hz. In Europe, power is typically supplied at around 380 V and at about 50 Hz. VSDs can convert various input power voltages and frequencies to desired voltages and frequencies for operating motors. Many motors in large-tonnage heating, ventilation, air-conditioning and refrigeration (HVAC&R) applications operate at frequencies around 30 to 60 Hz, but VSDs are not limited to outputting power at or between those frequencies.

The attached drawings show block diagrams of a typical variable speed drive system. Control signals and components in the drawing have been numbered for ease of understanding. These numbers will be referred to throughout this text.

Figure 2:
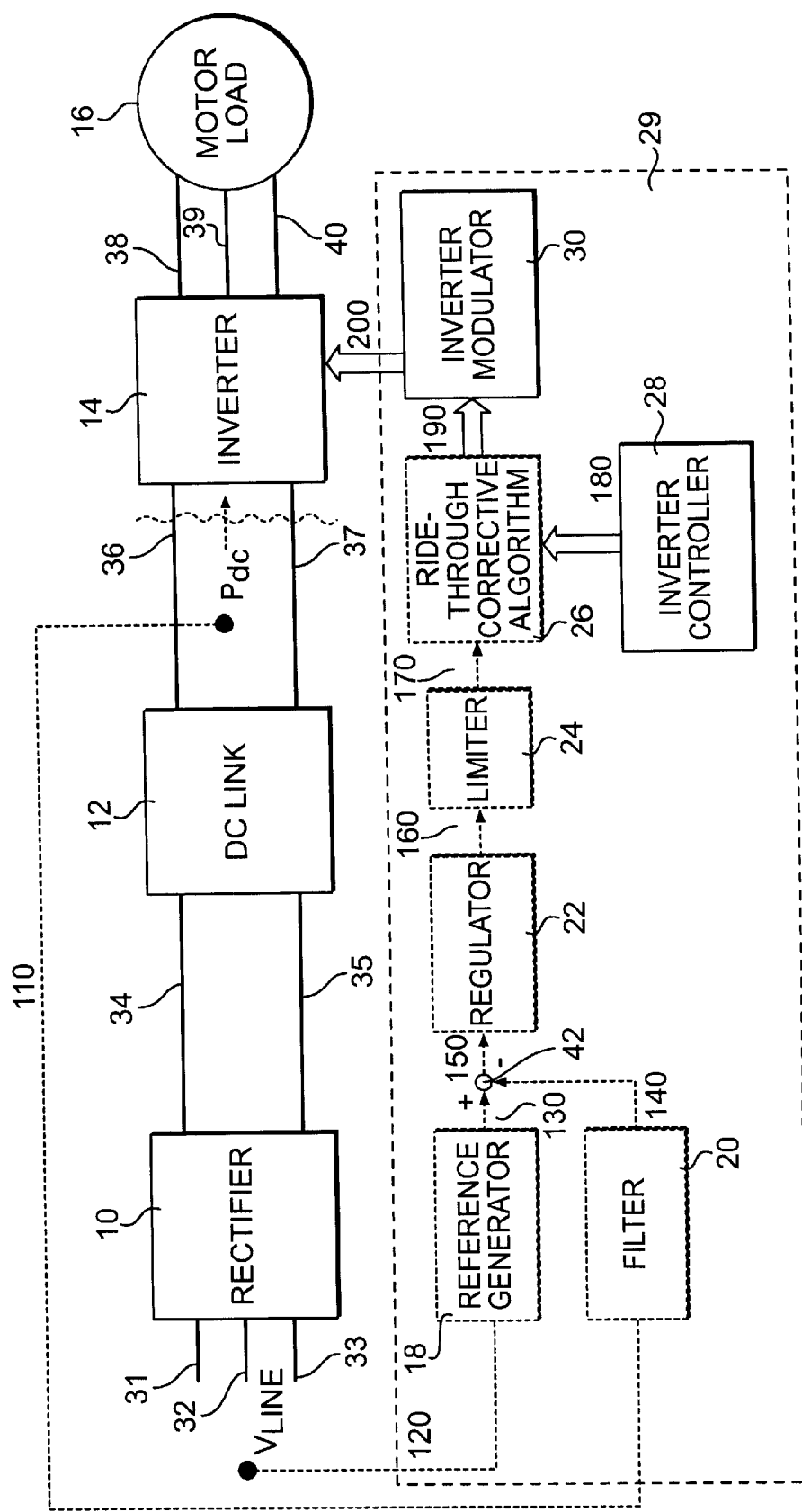
FIG. 2 is a schematic diagram of a more specific embodiment of a three stage variable speed drive with a ride through control loop comprising of various individual components.

A typical VSD may have three stages. As shown in FIGS. 1 and 2, the stages may include a rectifier 10, a DC link 12, and an inverter 14. The VSDs shown in FIGS. 1 and 2 take three-phase, fixed-voltage, fixed-frequency electric power from low voltage utility lines. As mentioned above, this is typically, but not limited to, 460V at 60 Hz. The input AC power is supplied to the rectifier 10 by three conductors 31, 32, and 33. The AC power is converted into DC power in the rectifier 10. The rectifier may, for example, be a non-controlled (passive) rectifier or it may be an active rectifier. For example, the rectifier may include a three phase diode bridge.

The DC voltage at the rectifier's output typically has a ripple, for example ±7% on average value. To reduce the ripple in the DC voltage before it is sent to the inverter 14, a DC link 12 is provided. The output of the rectifier 10 is sent to the DC link 12, via two conductors 34 and 35. The DC link filters the voltage supplied by the rectifier, i.e., it reduces the amount of ripple contained in this voltage, so that the DC voltage supplied by the DC link 12 to the inverter 14 contains a very small amount of ripple, e.g., ±2% on average value. This filtering is accomplished by components such as inductors and capacitors. The DC link can be purely capacitive or both inductive and capacitive. Apart from filtering the DC link voltage, capacitors and inductors also act as energy storage elements. This means that, during the normal functioning of a VSD system, a certain amount of energy is stored in these components by means of electric and magnetic fields. The output of the DC link 12 feeds an inverter 14, via conductors 36 and 37.

The inverter 14, controlled by controller 29, creates variable-voltage, variable-frequency AC power and delivers it to an AC load. Typically in an HVAC&R application, this load may be represented by an induction motor 16. The inverter 14 may incorporate semiconductor switches in three phase bridge configuration, electrically switching on and off. Typically, there may be 6 of these switches. Controlling the switches controls the inverter's AC output voltage, both the magnitude and frequency. The three phase AC inverter output is distributed to the motor via three lines 38, 39, and 40.

The inverter 14 may be controlled with six (or however many switches in the inverter) gating signals 200. Each gating signal turns on and off one particular semiconductor switch within the inverter. In the embodiment shown in FIG. 1, the gating signals are generated by controller 29. As is known, the controller typically includes hardware, software and input signals that are used to apply a desired voltage and frequency to the motor. This application is known and therefore will not be explained in more detail.

The controller 29 of the present invention has two additional inputs, as well as additional hardware or software to modify the control signals to the inverter, when a power sag occurs. Based on these additions, the controller of the present invention generates modified gating signals 200.

For example, when the motor load is a compressor for an air conditioning system, the controller may analyze system specific data relating to outside air temperature, amount of space to be air conditioned, and temperature of the space to be air conditioned, among other parameters. In addition, under the present invention shown, the controller 29 receives input reflecting the voltage input to the rectifier 10 ($V_{line}$) and the power leaving the DC link ($P_{DC}$). Because power from the DC link is DC current multiplied by DC voltage, the invention may be practiced by sensing DC link power itself, or voltage and current from the DC link, which are then multiplied in order to obtain the DC link power, whatever best suits the requirements of a particular system.

Based on these sensed variables, parameters and the preselected software or algorithms incorporated into the controller, the controller 29 sends gating signals to the inverter. The inverter than outputs such voltage and frequency to the motor load 16, so that air conditioning application requirements are satisfied.

During the steady state operation of the system, (i.e., no voltage sag condition) the power delivered by the rectifier 10 to the DC link 12 is approximately equal to the power delivered by the DC link 12 to the inverter 14 ($P_{DC}$), which in turn is approximately equal to the power delivered by the inverter 14 to the load 16. This is true because the efficiency of each individual stage is high, typically above 95%. The voltage at the output of the DC link 12 stays constant at a rated value due to the power balance under steady state operating conditions (power coming into the DC link is approximately equal to the power leaving the DC link). Without the present invention, when a voltage sag occurs, and inverter control signals are held at their steady-state values, this power balance becomes disrupted. The rectifier 10 stops delivering power to the DC link 12, while the inverter 14 continues draining power from the DC link 12 at the same rate at which it was draining power under steady state conditions. This causes the DC link 12 to discharge, i.e., the DC link output voltage drops because the energy accumulated in the DC link 12 during steady state operation is transferred to the inverter 14, without any new energy arriving from the rectifier to replace it. This typically results in an undervoltage shutdown of the drive.

The ride-through control loop of the present invention is designed to prevent an under-voltage shutdown by limiting the power drained from the DC link 12 whenever a voltage sag is detected. It does so through an appropriate modification of the inverter control signals.

In FIG. 1, the controller 29 receives input regarding DC link power $P_{DC}$ 110, input line AC voltage $V_{line}$ 120 in addition to input regarding the specific needs of the system (not shown). The controller monitors the voltage applied to the rectifier and determines whether a voltage sag has occurred. If a voltage sag is detected, the controller 29 modifies gating signal 200 to reduce the power the inverter draws from the DC link. In the preferred embodiment, the control generates the modified signals 200 that control the inverter to draw enough power from the DC link to roughly account for the losses in the motor load, and thus keep the motor rotating. This reduced amount of power allows the motor load to continue to rotate without loss of control, while conserving energy stored in the DC link.

The controller 29 may include a software program loaded into a computer, a microcontroller, a specialized chip, or an analog equivalent. A more detailed description of how the controller 29 may modify the signal 200 is described more fully below, as part of the description of the embodiment of FIG. 2. However, it will be recognized that the principles of the invention can be applied to a variety of controls, be they digital or analog.

In the embodiment of the invention shown in FIG. 2, the main components of the VSD system are shown in solid lines. The ride-through control loop is drawn with dotted lines and includes the inverter controller 28 and inverter modulator 30 (which are also part of the main VSD system). These components and their application provide gating signals to the inverter as known in the art. According to the present invention, a ride-through control loop modifies the signal generated in the inverter controller 28 under certain circumstances, to give the VSD better voltage sag ride-through capability.

The operation of the ride-through control loop is explained below. A voltage sag may be detected by monitoring the line voltage $V_{line}$ with a sensor. Signal 120, representative of the line voltage, is used to create a reference signal 130 for the ride-through control loop. This reference signal may assume two distinct values, depending on whether the line voltage is at its rated value (regular steady state operation typically 460V in U.S. ±10%), or a voltage sag has been detected (e.g., 90% or less of the rated value).

The inverter 14 is controlled by gating signals 200, generated by an inverter modulator 30. In order to generate the gating signals, the modulator 30 receives inverter control signals (e.g., output frequency command and output voltage magnitude command) 180 delivered by an inverter controller 28. The inverter controller determines the inverter control signals based on the requirements of a particular application (e.g., outside air temperature, amount of space to be air conditioned, and temperature of the space to be air conditioned in an HVAC&R application). The inverter controller can take a variety of forms, and for example, may be a micro-controller that obtains data and processes the data to determine how to control the modulator and inverter. Other known systems to control the inverter may also be used.

The ride-through control loop of the present invention needs to be active only if a voltage sag occurs at rectifier's input terminals 31, 31 and 33. If there is no voltage sag, i.e., under regular steady-state conditions, the ride-through control loop needs to be deactivated. This can be accomplished in a variety of ways. In one embodiment, under regular steady state operating conditions, the reference generator 18 sets the ride-through control loop reference signal to a very large value. This very large value can be chosen, for example, as ten times the motor load rated power. This saturates the ride-through control loop, i.e., the error signal 150 of the loop (obtained as the difference between the reference signal 130 and signal 140, which is equal to the average power being drawn from the DC link) becomes very high. Following the above example, the error signal 150 would be equal to at least nine times the motor output power. For a 500 hp motor, this would equal 3357 kW. This large value of signal 150 causes the loop output signal 170 to saturate to a predetermined maximum value. The system is set so that when the output signal 170 is set to a predetermined maximum value, the ride through corrective algorithm 26 (preferably in a microprocessor or a computer) passes the inverter control signals 180 directly into the inverter modulator 30 as signal 190 without modifying them. Under these conditions, the ride-through corrective algorithms are inactive, and the ride-through control loop has no effect on the system's operation.

Optionally, when a voltage sag is detected at the VSD's input, the reference generator 18 may set signal 130 to an appropriate "small" value, comparable to motor's losses under rated conditions. For example, if the load 16 were a 500 hp motor with 95% rated efficiency, its losses under rated conditions would be 19.6 kW. Then, the loop reference signal 130 could be set to approximately 20 kW (which is roughly equivalent to the motor losses of 19.6 kW) whenever a voltage sag is detected. As already explained, the voltage sag may be detected by a voltage sensor. For example, whenever the line voltage is 90% or less of the rated value it may detect a voltage sag.

Setting the reference signal to a small value causes the ride-through control loop to become active. In one embodiment, the reference value 130 represents the amount of power to be transferred from the DC link 12 to the inverter 14 during a voltage sag. In other words in a preferred embodiment, only an amount of power roughly comparable to the losses in the motor is allowed to be transferred. This means that the inverter will "unload" the motor, i.e., provide the power to compensate for motor losses, but no power will be available for electromechanical conversion. This may cause the motor to decelerate. However, due to motor and load inertia, and the limited duration of a voltage sag (usually a few line cycles), the deceleration likely will not be significant. At the same time, limiting the amount of power to be taken away from the DC link 12 during a voltage sag will cause the DC link voltage not to drop significantly during this transient. This may prevent an undervoltage shutdown of the VSD.

Preferably, the ride-through control loop reference signal 130 is compared to signal 140, representative of the actual average DC link power, in order to obtain the error signal 150. The DC link power signal 110, obtained, for example, by multiplying the DC link voltage with the DC link current, usually contains a large amount of high-frequency content (or power ripple) due to inverter's switching action. It therefore may need to be appropriately filtered in order to obtain signal 140, representative of the average power being delivered by the DC link 12. One type of filter that will reduce the high-frequency content is a low pass filter. A low pass filter will let lower frequencies pass but not high frequencies. One type of low pass filter is a moving average filter with adjustable averaging window, where the width of the averaging window is derived from the inverter's output frequency command signal.

In the embodiment shown in FIG. 2, the difference block 42 calculates the difference between the signals 140 and 130. Continuing the example illustrated above, if the reference generator 18 generated a reference signal 130 of about 20 kW and the DC link was transferring 100 kW ($P_{DC}$ 110) to the inverter, the difference block 42 would subtract 100 kW from 20 kW to yield error signal 150 of −80 kW.

In the embodiment shown in FIG. 2, the regulator 22 regulates how fast the control loop reacts to changes in error signal 150. A fast, but stable loop response is desired. If the loop response is too slow, the control loop will not be able to detect and compensate for a voltage sag before the VSD shuts down. Too fast a response, however, will make the loop unstable. The regulator 22, which can be of proportional-integral, or some other type, assures an optimal speed of ride-through control loop response.

The limiter 24 may limit the signal 160 to values typically handled by analog or digital circuitry. For example, the limiter might limit the signal to a value between ±10. In this example, whether signal 160 were 11 or 100 (or any other value larger than 10), the limiter would generate a value of 10 for signal 170. Likewise, if the signal 160 were −11 or −100 (or any other value smaller than −10) the limiter 24 would generate a value of −10 for signal 170. For values falling between ±10, the limiter 24 would allow the signal 160 to pass unchanged as signal 170.

The resulting signal 170 is an input to a ride-through corrective algorithm or program 26 incorporated into a computer control. Other inputs into this algorithm are the inverter control signals 180 (which, when ride-through control loop is not active, are passed directly to the inverter modulator). The ride-through corrective algorithm 26 combines the "raw" inverter control signals 180 with the output of the ride-through control loop 170. This results in the "corrected" inverter control signals 190, which control the inverter in such a way to limit the power flow from the DC link 12 to the inverter 14.

As an example, one possible implementation of ride-through corrective algorithm could be the following: Signal 170 is limited between an upper limit of 10 and a lower limit of −10. This signal is scaled down in magnitude by the ride-through corrective algorithm 26, after which it acts as a multiplier onto the inverter output frequency command. It does not affect the inverter output voltage amplitude command. This means that, as long as a voltage sag exists at the VSD input terminals, the frequency command to the inverter is modified by a small percentage of its steady state value. This modifies the fundamental frequency supplied to the motor, thus "unloading" the motor and limiting the power supplied to it.

Immediately before the end of a voltage sag, the motor operates at a speed somewhat lower than its rated speed, and the DC link voltage is somewhat reduced compared to its rated value. After the end of a voltage sag is detected, the ride-through control loop reference signal assumes its (very high) steady state value. This saturates high the output of the control loop 170, i.e., renders the control loop inactive, so that the inverter controller signals are again passed directly to the inverter modulator. Inverter control signals can then be slowly ramped back to their steady state values by the inverter controller 28 at a predetermined rate, and the VSD system resumes its steady state operation.

The entire loop as shown in FIG. 2, or combinations of portions of it may include of analog circuits or be contained in software or hardware computer programs.

VSDs may also have additional control loops not directly related to voltage sag ride-through capabilities. These unrelated loops are not shown or described herein.

The control method and system of the present invention does not require the sensing of motor speed and/or currents. Instead, the control is operated through the sensing of the DC link power (or the DC link voltage and current which multiplied together result in power), and the line voltage. This makes the invention particularly suitable for low cost variable speed drives for commercial applicators.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A variable speed drive comprising:
    a rectifier configured to receive AC power from a power source and output DC power;
    a DC link configured to receive DC power output from the rectifier, to store some amount of DC energy, and to output DC power;
    an inverter configured to receive DC power output from the DC link and convert the power back to AC power and output the AC power to a motor load;
    an inverter controller operatively connected to the inverter and configured to send gating signals to the inverter;
    a voltage sensor configured to sense voltage applied to the rectifier and provide that sensed voltage to the inverter controller; and
    a sensor configured to sense at least one of power, current, and voltage of output from at least one of the DC link and the inverter and provide that sensed information into the inverter controller, and wherein said inverter controller sends modified gating signals that reduce the power transferred from the inverter to the motor, when the voltage sensor senses a voltage sag.

2. The variable speed drive of claim 1, wherein the DC link is capacitive.

3. The variable speed drive of claim 1, wherein the DC link is both inductive and capacitive.

4. The variable speed drive of claim 1, wherein the amount of power transferred to the inverter during a voltage sag approximately corresponds to an amount of power losses associated with the motor load.

5. The variable speed drive of claim 1 wherein the inverter control is a computer.

6. The variable speed drive of claim 1 wherein the inverter control is a microprocessor.

7. The variable speed drive of claim 1 wherein the inverter control is a control loop.

8. The variable speed drive of claim 1, wherein the rectifier is an active rectifier.

9. The variable speed drive of claim 1, wherein the rectifier is a passive rectifier.

10. The variable speed drive of claim 9, wherein the rectifier comprises a three-phase diode bridge.

11. The variable speed drive of claim 1, wherein the inverter comprises semiconductor switches in three-phase bridge configuration.

12. The variable speed drive of claim 11, wherein the inverter comprises 6 semiconductor switches in three-phase bridge configuration.

13. A variable speed drive comprising:
  a rectifier configured to receive AC power from a power source and output DC power;
  a DC link configured to receive DC power output from the rectifier, to store some amount of DC energy, and to output DC power;
  an inverter to receive DC power output from the DC link and convert the power back to AC power and output the AC power to a motor load;
  an inverter controller operatively connected to the inverter and configured to send gating signals to the inverter;
  a voltage sensor configured to sense voltage applied to the rectifier and provide that sensed voltage to the inverter controller; and
  a sensor configured to sense at least one of power, current, and voltage of output from at least one of the DC link and the inverter and provide that sensed information into the inverter controller, and wherein said inverter controller sends modified gating signals that reduce the power transferred from the inverter to the motor, when the voltage sensor senses a voltage sag,
  wherein the inverter control is a control loop including;
    a reference generator operatively connected to the voltage sensor and configured to generate a reference signal;
    a filter operatively connected to the DC power sensor;
    a difference block operatively connected to the reference generator and the filter to subtract a filtered signal from the reference signal; and
    a regulator operatively connected to the output of the difference block, the regulator configured to generate a regulated signal.

14. The variable speed drive of claim 13, wherein the control loop further comprises a limiter for limiting a signal from the regulator and inputting the limited signal to a corrective algorithm within the control.

15. The variable speed drive of claim 13, where at least one of the reference generator, filter, regulator, and ride-through corrective algorithm include analog circuits.

16. The variable speed drive of claim 13, where at least one of the reference generator, filter, regulator, and ride-through corrective algorithm include software.

17. The variable speed drive of claim 13, wherein the reference generator sets a ride-through control loop reference signal that saturates the control loop and renders it inoperative when no voltage sag is detected, and the reference generator sets the ride-through control loop reference signal representative of losses associated with the motor load, when a voltage sag is detected.

18. The variable speed drive of claim 13, wherein the filter is a low pass filter.

19. The variable speed drive of claim 13, wherein the filter is a moving average filter with an adjustable averaging window.

20. A method for controlling a variable speed drive for a load, the drive including a rectifier, DC link, inverter, and an inverter control, the method comprising:
  monitoring a voltage applied to the rectifier;
  monitoring at least one of power, voltage, and current output from the DC link or the inverter;
  controlling the inverter to provide approximately full transfer of power from the rectifier to the load as long as the voltage to the rectifier remains within a preselected range; and
  controlling the inverter to provide significantly lower power to the load, whenever the voltage to the rectifier falls below the preselected range.

21. The method of claim 20 wherein the inverter is controlled as a function of the monitored voltage to rectifier and the monitored at least one of power, voltage, and current output of the DC link or the inverter.

22. The method of claim 20 wherein the load is a motor and the significantly lowered power to the load is approximately equal to the amount of power loss associated with the motor.

23. The method of claim 21 further comprising the step of:
  generating a reference signal as a function of the monitored voltage to the rectifier and subtracting from the reference signal a signal that is a function of the monitored at least one of power, voltage, and current output from the DC link or the inverter; and
  controlling the inverter based on the new signal.

24. The method of claim 20, further comprising filtering a signal representing the power applied to the inverter.

25. The method of claim 20, wherein the reference signal is representative of the losses associated with a motor load.

* * * * *